Jan. 17, 1928
J. D. MERRIFIELD
1,656,595
METHOD OF FORMING SCREW THREAD CUTTING TOOLS
Original Filed Feb. 19, 1923    2 Sheets-Sheet 1
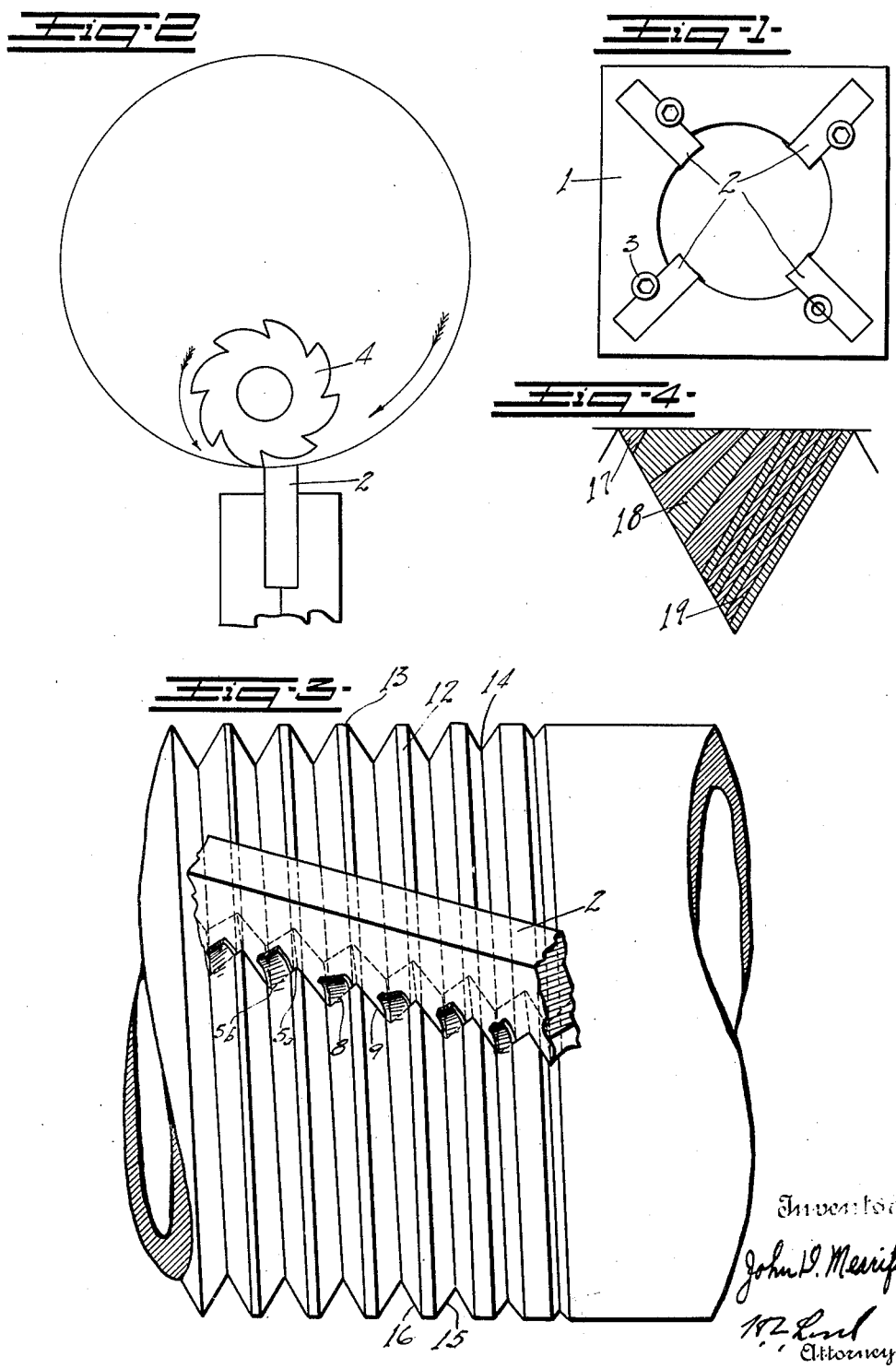

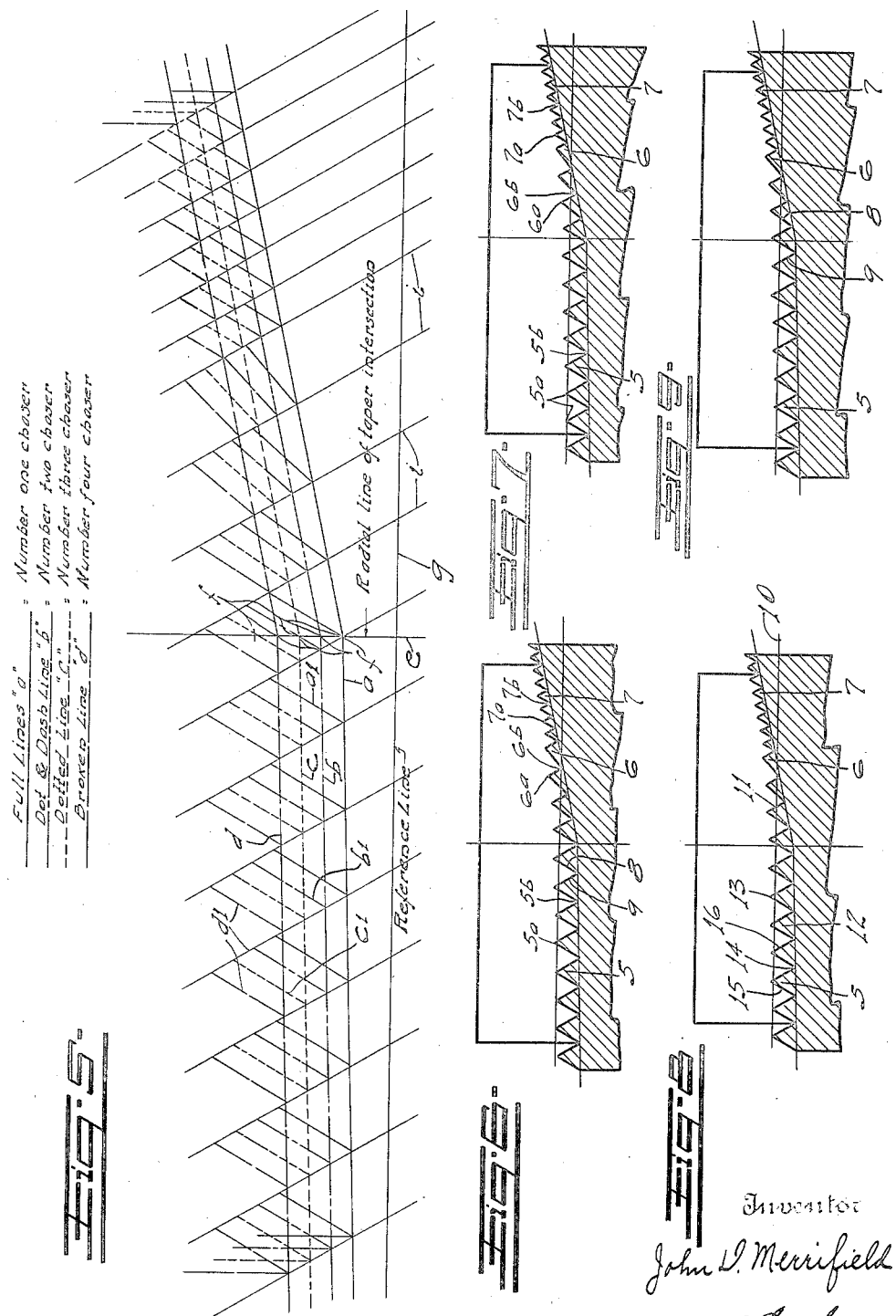

Patented Jan. 17, 1928.

1,656,595

UNITED STATES PATENT OFFICE.

JOHN D. MERRIFIELD, OF ERIE, PENNSYLVANIA, ASSIGNOR TO REED MANUFACTURING COMPANY, OF ERIE, PENNSYLVANIA, A CORPORATION OF PENNSYLVANIA.

METHOD OF FORMING SCREW-THREAD-CUTTING TOOLS.

Application filed February 19, 1923, Serial No. 619,881. Renewed June 27, 1927.

In forming screw thread cutting dies it has been common to form such dies with a milling cutter and where the dies have a single taper the variation in the threads from chaser to chaser may be readily taken care of by giving to the cutters and chasers the proper relative movement. A machine accomplishing this purpose is fully described and set forth in the patent to Wright and Hubbard, No. 1,033,142, July 23, 1912. Where the die, however, is provided with a throat and it is desired to cut the threads on this throat at a different taper from the taper of the main threads a single milling cutter can not be moved to compensate for the variations brought about by the taper, or because a movement to justify one taper would not correspond with the movement necessary to justify as to the other taper. By the method of the present invention dies with a double taper may be cut with milling cutters thus affording a means by which such dies may be given the radial and axial relief desired and may be formed with the slopes in continuous surfaces as distinguished from the step surfaces along one slope where the threads are cut with a tap. To accomplish this I provide a separate milling cutter shaped to cut each chaser and each milling cutter shaped to justify the cutting edges of each chaser relatively to each other for the different tapers.

I also provide with this invention a method by which dies having the threads spiraled and spaced to form the threads by cutting one slope of such threads may be made with a milling cutter.

The invention also involves the dies so made. Features and details of the invention will appear from the specification and claims.

The dies and apparatus for carrying out the method are illustrated in the accompanying drawings as follows:

Fig. 1 shows a side elevation of the finished die.

Fig. 3 an end view of a milling cutter operating on a chaser.

Fig. 3 is a plan view of a thread with a chaser in place indicating the manner of cutting.

Fig. 4 an enlarged view illustrating the successive cuts in forming the thread.

Fig. 5 a diagram giving a lay-out for forming the different milling cutters.

Fig. 6 an outline of one of the milling cutters and the chaser cut thereby.

Figs. 7, 8 and 9 similar views of the other three chasers forming the four chasers of the die.

1 marks the die body, 2 the chaser, and 3 the means for securing the chasers in the die body. It will be understood that any convenient die body and means of securing the chasers may be used. 4 marks a milling cutter. It will be understood that this is to be mounted in a machine, a suitable one being illustrated in the Wright and Hubbard patent above referred to and the chaser 2 is mounted in any suitable holder such as is indicated in that machine. It will be understood, however, that for each chaser a separate milling cutter is provided and that each chaser is registered on the machine from the same point so that each milling cutter will form its thread in proper relation to the end of the chaser, or where the chaser has a double taper in proper relation to the radial line at the intersection of the tapers. The milling cutter has the different teeth, 5 forming the finished thread, 6 the starting threads, and 7 the entrance threads. The finishing teeth 5 have the crests $5^a$ and the troughs $5^b$, the starting teeth have the crests $6^a$ and the troughs $6^b$, and the entering teeth have the crests $7^a$ and the troughs $7^b$. 8 is the forward or cutting slope of the teeth and 9 the rearward or guiding slope. A line 10 indicates the line of the surface of the material ordinarily forming the crests of the finished thread and the intersection of this line with the slopes 9 at 11 indicates the spiral which may be termed the master spiral which is the spiral followed by the die in cutting the thread forming the teeth 12 having the crests 13 and troughs 14, these having the forward slopes 15 and rearward slopes 16.

I prefer to form the starting teeth 6 with the slope 8 less abruptly inclined than the succeeding slopes so that the die may be more readily started. The entrance teeth 7 are of the same pitch as the remaining teeth but are finer, preferably two teeth for each of the spaces between the remaining teeth. They are desirable in starting a die particularly over a burr.

In Fig. 5 I have indicated a lay-out for making the milling cutters. This lay-out is based on a reference line $g$ and a radial line c at the intersection of the tapers. Taking a point on the radial line the proper taper for one of the milling cutters as $a$ is laid out having an intersection at the line $e$. The distances between the threads to be cut by the die are laid out on the reference line $g$ and parallel lines $i$ having the inclination of the slopes of the threads are laid up from the reference line $g$. The points of intersection of the lines $i$ and the lines $a$—$b$—$c$—$d$ form the crests $5^b$, $6^b$ and $7^b$ of one of the chasers to be formed by one of the milling cutters, in other words, would be the trough of the teeth on the milling cutter and the lines of the milling cutter are indicated in solid lines $a'$ extending upwardly from the line $a$.

The space between the crests of the teeth on the line $a$ is divided into four parts and laid up at points $f$ on the line $e$. The lines $b$, $c$ and $d$ are laid off from the line $e$ parallel to the line $a$. These are differentiated as indicated on the drawings and the points of intersection of the lines $j$ with these several lines form the crests in the lay-out of the chasers. The lines $b'$ would show the outlines of the teeth on the milling cutter for a second chaser, $c'$ the lines for the third milling chaser, and $d'$ the lines on the milling cutter for the fourth chaser. When these milling cutters are arranged in the machine such as the Wright and Hubbard structure, as before stated, they are each registered with its proper cutter from the same point and the lay-out justifies each milling cutter relatively to the others. The lead of the screw in the machine of Wright and Hubbard is varied as desired to give the proper axial clearance and the cam of the Wright and Hubbard patent is given the proper slope to give the desired radial clearance, that is to say, the chaser is moved radially relatively to the milling cutter as it is advanced to give relief and if desired the cutter may also be moved along one of the lines of taper, or in an intermediate line in the manner of the Wright and Hubbard patent. It will be understood that except at the cutting edge the thread formed by the milling cutter will not follow exactly the correct threads on both tapers.

Where the chaser is made in the manner just described and the spiral 11 arranged relatively to the thread to be cut as suggested the cut formed by the die is along one slope of the threads cut, as indicated along the slope 8. The spiral at the point 11 which forms the front edge of the flat crest of the threads as the cut is started is the spiral of the cut of the die and this spiral, as it will be noted, is along one slope of the teeth of the die as distinguished from being in a radial direction from the crest or trough as is common with dies which cut on both slopes of the thread.

In Figs. 3 and 4 there is illustrated the progressive cutting of the die made in the manner of this invention. In Fig. 4 the cuts 17 indicate the cut taken by the entrance teeth, the cuts 18 those by the starting teeth and the cuts 19 those by the finishing teeth.

What I claim as new is:—

1. The method of forming thread cutting tools having a double taper which consists in cutting each group of threads with a separate milling cutter shaped to justify the cutting edge of the teeth in one group with relation to the other group and for each taper.

2. The method of forming screw thread cutting dies having a double taper which consists in cutting each chaser of the die with a separate milling cutter shaped to justify the cutting edge of the teeth in thread cutting relation in the die for each taper.

3. The method of forming thread cutting tools having a double taper which consists in cutting each group of threads with a separate milling cutter shaped to justify the cutting edge of the teeth in one group with relation to the other group and for each taper, and moving the cutters and teeth being cut relatively to each other as the teeth are cut to relieve the teeth.

4. The method of forming screw thread cutting dies having a double taper which consists in cutting each chaser of the die with a separate milling cutter shaped to justify the cutting edge of the teeth in thread cutting relation in the die for each taper, and moving the cutters and teeth being cut relatively to each other as the teeth are cut to relieve the teeth.

5. The method of forming thread cutting tools having a double taper which consists in cutting each group of threads with a separate milling cutter shaped to justify the cutting edge of the teeth in one group with relation to the other group and for each taper and leading the cutter relatively to the teeth being cut to form the lead on the teeth in a spiral along one slope of the teeth.

6. The method of forming screw thread cutting dies having a double taper which consists in cutting each chaser of the die with a separate milling cutter shaped to justify the cutting edge of the teeth in thread cutting relation in the die for each taper and leading the cutter relatively to the teeth being cut to form the lead on the teeth in a spiral along one slope of the teeth.

7. The method of forming thread cutting tools having a double taper which consists in cutting each group of threads with a separate milling cutter shaped to justify the cutting edge of the teeth in one group with relation to the other group and for each taper and with the teeth spaced and spiraled to make the cut of a thread formed by the cutting tool along one slope of the thread cut.

8. The method of forming thread cutting dies having a double taper which consists in cutting each chaser of the die with a separate milling cutter shaped to justify the cutting edge of the teeth in thread cutting relation in the die for each taper, and with the teeth spaced and spiraled to make the cut of a thread formed by the die along one slope of the thread cut.

In testimony whereof I have hereunto set my hand.

JOHN D. MERRIFIELD.